United States Patent
Kawakami et al.

(10) Patent No.: US 10,906,009 B2
(45) Date of Patent: Feb. 2, 2021

(54) METHOD FOR MANUFACTURING GAS SEPARATION MEMBRANE

(71) Applicants: NISSAN CHEMICAL CORPORATION, Tokyo (JP); TOKYO METROPOLITAN UNIVERSITY, Tokyo (JP)

(72) Inventors: Hiroyoshi Kawakami, Hachioji (JP); Manabu Tanaka, Hachioji (JP); Yuri Kameyama, Hachioji (JP); Azusa Osawa, Hachioji (JP); Tadayuki Isaji, Funabashi (JP); Takamasa Kikuchi, Funabashi (JP)

(73) Assignees: NISSAN CHEMICAL CORPORATION, Tokyo (JP); TOKYO METROPOLITAN UNIVERSITY, Tokyo (JP)

( * ) Notice: Subject to any disclaimer, the term of this patent is extended or adjusted under 35 U.S.C. 154(b) by 243 days.

(21) Appl. No.: 16/093,877

(22) PCT Filed: Apr. 17, 2017

(86) PCT No.: PCT/JP2017/015436
§ 371 (c)(1),
(2) Date: Oct. 15, 2018

(87) PCT Pub. No.: WO2017/179738
PCT Pub. Date: Oct. 19, 2017

(65) Prior Publication Data
US 2019/0083942 A1 Mar. 21, 2019

(30) Foreign Application Priority Data

Apr. 15, 2016 (JP) ................................ 2016-082423

(51) Int. Cl.
| | | |
|---|---|---|
| *B01D 69/14* | (2006.01) | |
| *B01D 71/26* | (2006.01) | |
| *B01D 71/64* | (2006.01) | |
| *B01D 71/68* | (2006.01) | |
| *B01D 71/70* | (2006.01) | |
| *B82Y 40/00* | (2011.01) | |

(Continued)

(52) U.S. Cl.
CPC ......... *B01D 69/148* (2013.01); *B01D 53/228* (2013.01); *B01D 67/0079* (2013.01); *B01D 71/027* (2013.01); *B01D 71/26* (2013.01); *B01D 71/64* (2013.01); *B01D 71/68* (2013.01); *B01D 71/70* (2013.01); *B82Y 40/00* (2013.01); *C01B 33/18* (2013.01); *C09C 1/28* (2013.01); *C09C 3/10* (2013.01); *B01D 71/024* (2013.01); *B01D 71/78* (2013.01); *B01D 71/82* (2013.01); *B01D 2257/504* (2013.01); *B01D 2323/36* (2013.01); *B01D 2323/38* (2013.01); *B01D 2325/20* (2013.01); *B01D 2325/22* (2013.01); *B01D 2325/24* (2013.01); *B82Y 30/00* (2013.01); *C01P 2004/64* (2013.01); *C09C 3/08* (2013.01)

(58) Field of Classification Search
CPC ............ B01D 53/228; B01D 69/0079; B01D 69/141; B01D 69/148; B01D 71/024; B01D 71/027; B01D 71/70; C09C 3/08; C09C 3/10; C09C 3/12; C01B 33/18; C08K 3/36
See application file for complete search history.

(56) References Cited

U.S. PATENT DOCUMENTS

| | | | |
|---|---|---|---|
| 2007/0298259 A1* | 12/2007 | Matsumoto | C09C 3/10 428/407 |
| 2010/0041775 A1* | 2/2010 | Waki | C01G 23/047 516/88 |

(Continued)

FOREIGN PATENT DOCUMENTS

| | | |
|---|---|---|
| JP | H06-166829 A | 6/1994 |
| JP | 2007-99607 A | 4/2007 |

(Continued)

OTHER PUBLICATIONS

Jun. 13, 2017 International Search Report issued in International Patent Application PCT/JP2017/015436.
S. Takahashi et al; "Gas permeation in poly(ether imide) nanocomposite membranes based on surface-treated silica. Part 2: With chemical coupling to matrix"; Polymer 47; 2006; pp. 7535-7547.

(Continued)

*Primary Examiner* — Jason M Greene
(74) *Attorney, Agent, or Firm* — Oliff PLC

(57) ABSTRACT

A method for producing a gas separation membrane, including the following steps: step (a): treating the surfaces of silica nanoparticles dispersed in a first solvent with a reactive functional group-containing compound, while nanoparticles are being dispersed in the solvent, to thereby prepare a first solvent dispersion of reactive functional group-modified silica nanoparticles; step (b): replacing the first solvent dispersion's dispersion medium of reactive functional group-modified silica nanoparticles prepared in step (a) with a second solvent without drying of dispersion medium, and then reacting functional group-modified silica nanoparticles with dendrimer-forming monomer or hyperbranched polymer-forming monomer in the second solvent's presence so that dendrimer or hyperbranched polymer is added to reactive functional group, to thereby prepare dendrimer- or hyperbranched polymer-bound silica nanoparticles; step (c): mixing dendrimer- or hyperbranched polymer-bound silica nanoparticles prepared in step (b) with a matrix resin; and step (d): applying mixture prepared in step (c) to a substrate, and then removing the solvent.

13 Claims, No Drawings

(51) Int. Cl.
    *C09C 3/10*     (2006.01)
    *C09C 1/28*     (2006.01)
    *B01D 67/00*     (2006.01)
    *C01B 33/18*     (2006.01)
    *B01D 53/22*     (2006.01)
    *B01D 71/02*     (2006.01)
    *B01D 71/78*     (2006.01)
    *B01D 71/82*     (2006.01)
    *B82Y 30/00*     (2011.01)
    *C09C 3/08*     (2006.01)

(56) References Cited

U.S. PATENT DOCUMENTS

2012/0270976 A1* 10/2012 Kawakami ........... B01D 53/228
    524/217
2013/0143043 A1* 6/2013 Iwanaga ................ C01B 33/18
    428/402

FOREIGN PATENT DOCUMENTS

| JP | 2010-222228 | * | 10/2010 | ............ B01D 53/22 |
| JP | 2010-222228 | A | 10/2010 | |
| JP | 2012-224777 | A | 11/2012 | |
| JP | 2013-75822 | A | 4/2013 | |

OTHER PUBLICATIONS

Sep. 12, 2019 Extended Search Report issued in European Patent Application No. 17782551.0.

* cited by examiner

METHOD FOR MANUFACTURING GAS SEPARATION MEMBRANE

TECHNICAL FIELD

The present invention relates to a method for producing a gas separation membrane containing dendrimer- or hyperbranched polymer-added silica nanoparticles; i.e., silica nanoparticles onto which a dendrimer- or a hyperbranched polymer is bound.

BACKGROUND ART

In recent years, studies on fine particles (nanoparticles) having a particle size on the order of nanometers (i.e., a mean particle size of 1 nm to several hundreds of nanometers) have been actively conducted as part of nanotechnology research. Unlike the case of a conventional bulk material, nanoparticles (i.e., nanosized material) are known to exhibit and impart various functions and characteristics, and thus are expected to have applications in a wide range of industrial fields.

Although nanoparticles can be produced in the form of primary particles, they have strong aggregation property attributed to their fineness and, when left to stand, form aggregates having a particle size on the order of micrometers. For example, in the case where inorganic nanoparticles as described above are added to an organic component, thermal resistance and mechanical strength will be improved, but the inorganic nanoparticles, which have strong aggregation property, may form aggregates on the order of micrometers in an organic solvent or a polymer matrix. Consequently, the resultant organic-inorganic composite material may fail to exhibit expected properties and performance. Thus, uniform chemical modification of the surfaces of nanoparticles has been proposed for maintaining their primary particle dispersibility (see, for example, Patent Document 1).

Furthermore, attention has been paid to an organic-inorganic composite material that is prepared by mixing of an inorganic component and an organic component at a nanometric or molecular level and can synergistically increase the advantages of both the components. This concept has been applied to polymer gas separation membranes whose utility has received attention for solving energy and environmental problems. Thus, demand has arisen for preparation of an organic-inorganic composite material through addition of inorganic nanoparticles to a polymer matrix to achieve high mechanical strength, thermal stability, and gas permeability, which cannot be attained by conventional techniques.

A gas separation method using the gas permeability of a polymer membrane can achieve gas separation and recovery without causing a phase change of gas. The gas separation method involves a simpler operation than another gas separation technique, can use a small-sized apparatus, and enables continuous gas separation. Thus, the gas separation method is advantageous in terms of low environmental load. Such an energy-saving method using a polymer gas separation membrane has recently received particular attention as a technique for separation and recovery of greenhouse gases, preparation of oxygen-enriched air, or purification of natural gas. Although such a method is expected to be used in practice, the method needs further improvements in gas separation performance and gas permeability.

As described above, attempts have been made to improve the gas permeability of a polymer membrane by incorporation of inorganic nanoparticles into the membrane. The aforementioned aggregation of nanoparticles also causes problems in preparation of an organic-inorganic composite gas separation membrane. Specifically, an existing organic-inorganic composite gas separation membrane exhibits low membrane strength and fails to achieve high particle content, which are caused by aggregation of inorganic nanoparticles in a polymer matrix. Thus, such a gas separation membrane has a problem in that an increase in gas permeability is at most a factor of several times.

For example, there has been reported a method for improving the gas separation membrane performance of a polymer membrane by incorporation of inorganic nanoparticles into the membrane, the method involving treatment of the surfaces of silica nanoparticles with an amino group-containing silane coupling agent, treatment of the surface-silylated particles with a polymer to thereby prepare polymer-grafted silica particles, and dispersion of the polymer-grafted silica particles into a polymer, to thereby form a resin membrane. The resin membrane was examined for its performance as a gas separation membrane (see Non-Patent Document 1). The results of the examination demonstrate that the membrane exhibits, for example, unsatisfactory gas permeability.

In order to solve such a problem, there has been proposed a gas separation membrane exhibiting considerably improved gas permeability and containing inorganic nanoparticles that do not aggregate in an organic solvent or a polymer matrix and exhibit excellent uniform dispersibility, wherein the nanoparticles are prepared by bonding of the surfaces of silica nanoparticles to a bulky hyperbranched polymer or dendrimer (see Patent Document 2).

PRIOR ART DOCUMENTS

Patent Documents

Patent Document 1: Japanese Patent Application Laid-Open (kokai) No. 2007-99607
Patent Document 2: Japanese Patent Application Laid-Open (kokai) No. 2010-222228

Non-Patent Document

Non-Patent Document 1: Polymer, 47 (2006), pp. 7535-7547

SUMMARY OF THE INVENTION

Problems to be Solved by the Invention

The present inventors have examined the technique disclosed in Patent Document 2 for development of a method for improving the performance of a gas separation membrane through incorporation of inorganic nanoparticles into a polymer membrane. The present inventors have found that the technique disclosed in Patent Document 2 has the following problems: silica nanoparticles dried in a production process tend to aggregate and non-uniformly disperse in a polymer matrix, breakage occurs in a gas separation membrane having a modified silica content of more than 30 mass % (i.e., the modified silica content is limited to 30 mass % or less), and thus the gas separation membrane exhibits unsatisfactory gas permeability.

An object of the present invention is to provide a method for producing a gas separation membrane exhibiting very excellent gas permeability and containing surface-modified silica nanoparticles that do not aggregate in a polymer matrix and exhibit excellent uniform dispersibility.

The present inventors have conducted extensive studies for solving the aforementioned problems, and have found that a gas separation membrane having considerably improved gas permeability and containing nanoparticles exhibiting excellent uniform dispersibility can be produced through a method involving bonding a bulky hyperbranched polymer or dendrimer to silica nanoparticles while the particles are dispersed in a solvent, and then mixing of the resultant nanoparticles with a resin matrix. The present invention has been accomplished on the basis of this finding.

Means for Solving the Problems

Accordingly, the present invention is directed to a method for producing a gas separation membrane as described in any one of the following first to fourteenth aspects.

First aspect: a method for producing a gas separation membrane, characterized by comprising the following steps (a), (b), (c), and (d):

step (a): a step of treating the surfaces of silica nanoparticles dispersed in a first solvent with a reactive functional group-containing compound, while the particles are being dispersed in the solvent, to thereby prepare a first solvent dispersion of reactive functional group-modified silica nanoparticles;

step (b): a step of replacing the dispersion medium of the first solvent dispersion of reactive functional group-modified silica nanoparticles prepared in step (a) with a second solvent without drying of the dispersion medium, and then reacting the reactive functional group-modified silica nanoparticles with a dendrimer-forming monomer or a hyperbranched polymer-forming monomer in the presence of the second solvent so that a dendrimer or a hyperbranched polymer is bound to the reactive functional group, to thereby prepare dendrimer- or hyperbranched polymer-bound silica nanoparticles;

step (c): a step of mixing the dendrimer- or hyperbranched polymer-bound silica nanoparticles prepared in step (b) with a matrix resin; and step (d): a step of applying the mixture prepared in step (c) to a substrate, and then removing the solvent.

Second aspect: a method for producing a gas separation membrane according to the first aspect, wherein the first solvent is at least one species selected from among water and C1 to C4 alcohols.

Third aspect: a method for producing a gas separation membrane according to the first or second aspect, wherein the second solvent is at least one species selected from among tetrahydrofuran, N-methylpyrrolidone, dimethylacetamide, dimethylformamide, and γ-butyrolactone.

Fourth aspect: a method for producing a gas separation membrane according to any one of the first to third aspects, wherein the reactive functional group-containing compound is a silane coupling agent.

Fifth aspect: a method for producing a gas separation membrane according to any one of the first to fourth aspects, wherein the reactive functional group-containing compound is a compound represented by the following formula (1):

[F1]

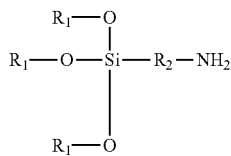

(wherein $R_1$ represents a methyl group or an ethyl group, and $R_2$ represents a C1 to C5 alkylene group).

Sixth aspect: a method for producing a gas separation membrane according to the fifth aspect, wherein, in step (a), the surfaces of silica nanoparticles are treated with the reactive functional group-containing compound represented by formula (1) and then treated with another reactive functional group-containing compound, which is a compound represented by the following formula (2):

[F2]

$$HOOC-R_3-CCOH \qquad (2)$$

(wherein $R_3$ represents a C1 to C20 alkylene group or an aromatic group) or an acid anhydride thereof while the silica nanoparticles are being dispersed in the first solvent, to thereby prepare a first solvent dispersion of reactive functional group-modified silica nanoparticles.

Seventh aspect: a method for producing a gas separation membrane according to any one of the first to sixth aspects, wherein the dendrimer-forming monomer is a compound having two or more carboxyl groups and a compound having two or more amino groups.

Eighth aspect: a method for producing a gas separation membrane according to any one of the first to sixth aspects, wherein the dendrimer-forming monomer is a compound having two or more amino groups and a compound having two or more carboxyl groups.

Ninth aspect: a method for producing a gas separation membrane according to any one of the first to sixth aspects, wherein the hyperbranched polymer-forming monomer is a compound having one carboxyl group and two or more amino groups or halogen atoms.

Tenth aspect: a method for producing a gas separation membrane according to any one of the first to sixth aspects, wherein the hyperbranched polymer-forming monomer is a compound having one amino group and two or more carboxyl groups or halogen atoms.

Eleventh aspect: a method for producing a gas separation membrane according to any one of the first to tenth aspects, wherein the matrix resin is at least one species selected from the group consisting of polyimide, polysulfone, polydimethylsiloxane, poly(substituted acetylene), poly-4-methylpentene, and natural rubber.

Twelfth aspect: a method for producing a gas separation membrane according to any one of the first to eleventh aspects, wherein, in step (c), the dendrimer- or hyperbranched polymer-bound silica nanoparticles are contained in the mixture in an amount of 1 mass % to 70 mass %.

Thirteenth aspect: a method for producing a gas separation membrane according to any one of the first to twelfth aspects, wherein, in step (d), the solvent is removed by heating.

Fourteenth aspect: a method for producing a gas separation membrane according to any one of the first to thirteenth aspects, wherein, in step (d), the solvent is removed under vacuum.

Effects of the Invention

The gas separation membrane produced through the method of the present invention contains hyperbranched polymer- or dendrimer-bound silica nanoparticles that do not aggregate and are uniformly dispersed in a matrix resin. The gas separation membrane exhibits excellent gas separation performance and has very high gas permeability.

MODES FOR CARRYING OUT THE INVENTION

The present invention will next be described in more detail.

In the present invention, the silica nanoparticles used for forming dendrimer- or hyperbranched polymer-bound silica nanoparticles are silica nanoparticles that are conventionally used as, for example, a filler for formation of a polymer membrane and have a primary particle size on the order of nanometers.

In the present invention, dendrimer- or hyperbranched polymer-bound silica nanoparticles can be prepared as follows. Firstly, silica nanoparticles dispersed in a solvent are treated with a compound having, in the molecule thereof, a group that reacts with a silanol group present on the surfaces of the silica nanoparticles to form a covalent bond and a reactive functional group that functions as a bonding group during formation of a dendrimer or a hyperbranched polymer, to thereby prepare reactive functional group-modified silica nanoparticles. Subsequently, the reactive functional group is reacted with a dendrimer-forming monomer or a hyperbranched polymer-forming monomer while the reactive functional group-modified silica nanoparticles being are dispersed in the solvent.

Now will be described in detail a method for producing dendrimer- or hyperbranched polymer-bound silica nanoparticles from silica nanoparticles.

No particular limitation is imposed on the silica nanoparticles used in the present invention, so long as they have a particle size on the order of nanometers. From the viewpoint of, for example, gas permeability, the silica nanoparticles have a mean primary particle size (as determined by the nitrogen adsorption method) of 2 nm to 500 nm, preferably about 5 nm to about 300 nm, more preferably 5 nm to 100 nm.

In the present invention, silica nanoparticles are used while being dispersed in a first solvent for improving the uniformity of surface modification reaction. The first solvent is a hydrophilic solvent, preferably at least one species selected from the group consisting of water and C1 to C4 alcohols. The first solvent may be a solvent mixture.

Silica nanoparticles dispersed in the first solvent may be used as is. Alternatively, silica nanoparticles dispersed in another solvent may be provided, the solvent may be replaced with the first solvent, and the resultant first solvent dispersion of silica nanoparticles may be used.

Examples of the C1 to C4 alcohol include methanol, ethanol, 1-propanol, 2-propanol, 1-butanol, 2-butanol, 2-methyl-1-propanol, and 2-methyl-2-propanol.

Silica nanoparticles dispersed in the first solvent are treated with a reactive functional group-containing compound having a functional group that reacts with a hyperbranched polymer-forming monomer or a dendrimer-forming monomer, whereby the reactive functional group is bound to the surfaces of the silica nanoparticles. During treatment of the silica nanoparticles dispersed in the first solvent with a reactive functional group-containing compound described below, the first solvent may be replaced with another first solvent.

The reactive functional group-containing compound is preferably a silane coupling agent; for example, a compound represented by the following formula (1) (i.e., a compound having an amino group at its terminal):

[F1]

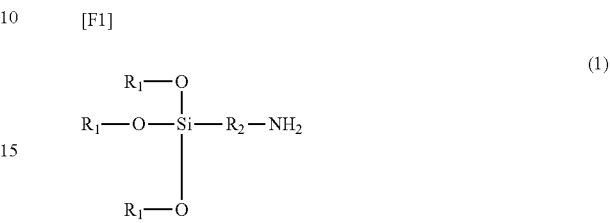

(wherein $R_1$ represents a methyl group or an ethyl group, and $R_2$ represents a C1 to C5 alkylene group, an amido group, or an aminoalkylene group).

The silane coupling agent represented by the formula (1) preferably has an amino group at the terminal, but the amino group is not necessarily located at the terminal.

Examples of the compound represented by the formula (1) include 3-aminopropyltriethoxysilane and 3-aminopropyltrimethoxysilane. Typical examples of other amino group-containing silane coupling agents include 3-ureidopropyltrimethoxysilane, 3-ureidopropyltriethoxysilane, 3-(2-aminoethylamino)propyltriethoxysilane, and 3-(2-aminoethylamino) propyltrimethoxysilane.

The reactive functional group-containing compound used in the present invention may have a group other than an amino group, such as an isocyanato group, a mercapto group, a glycidyl group, a ureido group, or a halogen group.

Examples of the silane coupling agent having a functional group other than an amino group include 3-isocyanatopropyltriethoxysilane, 3-mercaptopropylmethyldimethoxysilane, 3-mercaptopropyltrimethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, 3-ureidopropyltriethoxysilane, and 3-chloropropyltrimethoxysilane.

The reactive functional group-containing compound used in the present invention is not necessarily a trialkoxysilane compound represented by the formula (1). For example, the reactive functional group-containing compound may be a dialkoxysilane compound or a monoalkoxysilane compound.

The functional group of the reactive functional group-containing compound that reacts with the silanol group of silica nanoparticles may be a group other than an alkoxy group, such as an isocyanato group, a mercapto group, a glycidyl group, a ureido group, or a halogen atom.

For treatment of silica nanoparticles with the reactive functional group-containing compound, the reactive functional group-containing compound is bound to the silica nanoparticles dispersed in water or a C1 to C4 alcohol, and the resultant mixture is agitated.

Addition of the reactive functional group to the surfaces of silica nanoparticles may be performed by the aforementioned one-step reaction, or may optionally be performed by a two (or more)-step reaction. For example, carboxyl group-modified silica nanoparticles can be prepared by a two-step reaction as follows. Firstly, silica nanoparticles are treated with aminoalkyltrialkoxysilane as described above, to thereby prepare amino group-modified silica nanoparticles. Subsequently, the amino group-modified silica nanoparticles are treated with a dicarboxylic acid compound represented by the formula (2):

[F2]

HOOC—R$_3$—OOOH     (2)

(wherein R$_3$ represents a C1 to C20 alkylene group or an aromatic group) or an acid anhydride thereof, to thereby prepare reactive functional group-bound silica nanoparticles wherein the reactive functional group has a carboxyl group at its terminal.

Examples of the compound represented by the formula (2) include malonic acid, adipic acid, and terephthalic acid. The dicarboxylic acid compound is not limited to those represented by the aforementioned formula.

The reactive functional group can be bound to the surfaces of silica nanoparticles by a three or more-step reaction as follows: a monomer represented by the following formula (3) (i.e., a monomer having two amino groups at both terminals):

[F3]

H$_2$N—R$_4$—NH$_2$     (3)

(wherein R$_4$ represents a C1 to C20 alkylene group, or (C$_2$H$_5$—O—)$_p$ and/or (C$_3$H$_7$—O—)$_q$, and each of p and q is an integer of 1 or more) is bound to silica nanoparticles treated with a compound represented by the formula (1) and then with a compound represented by the formula (2), to thereby prepare surface-modified silica nanoparticles wherein the surface modification group has an amino group at its terminal, and the aforementioned reaction is repeated.

Examples of the monomer represented by the formula (3) include ethylenediamine, polyoxyethylenebisamine (molecular weight: 2,000), and O,O'-bis(2-aminopropyl)polypropylene glycol-block-polyethylene glycol (molecular weight: 500).

The dispersion medium of the thus-prepared first solvent dispersion of the reactive functional group-modified silica nanoparticles is replaced with a second solvent without drying of the dispersion medium.

The second solvent has hydrophobicity higher than that of the first solvent. The second solvent is preferably at least one species selected from among tetrahydrofuran (THF), N-methylpyrrolidone (NMP), dimethylacetamide (DMAc), dimethylformamide (DMF), and γ-butyrolactone (GBL). The second solvent may be a solvent mixture.

After preparation of the second solvent dispersion of the reactive functional group-modified silica nanoparticles through the solvent replacement, a dendrimer or a hyperbranched polymer, which has a multi-branched structure, is bound to the reactive functional group-modified silica nanoparticles in the presence of the second solvent. Specifically, a dendrimer-forming monomer or a hyperbranched polymer-forming monomer is reacted with the reactive functional group-modified silica nanoparticles, to thereby prepare silica nanoparticles having the reactive functional group to which a dendrimer or a hyperbranched polymer is bound. Thus, a second solvent dispersion of dendrimer- or hyperbranched polymer-bound silica nanoparticles is obtained.

The dendrimer is synthesized by the divergent method or the convergent method. The divergent method involves protection-deprotection reaction of building blocks performed outward from a central core molecule. The convergent method involves inward synthesis of dendrons (i.e., dendrimer subunits) and subsequent coupling of the dendrons with a core molecule.

The hyperbranched polymer is basically synthesized by self-condensation of an AB2 monomer. The hyperbranched polymer can be much more easily synthesized than the dendrimer. The structure and molecular weight distribution of the hyperbranched polymer are not precisely restricted as compared with the case of the dendrimer. The hyperbranched polymer is in the form of a mixture of compounds having different molecular weights and branching degrees, and can be handled in the same manner as a common polymer. In the present invention, the hyperbranched polymer is preferably bound to silica nanoparticles from the viewpoint of ease of production.

The hyperbranched polymer-forming monomer used in the present invention is preferably a compound represented by the following formula (4); i.e., a compound having one carboxyl group and two amino groups:

[F4]

(wherein R$_5$ represents a C1 to C20 alkylene group or an aromatic group). The hyperbranched polymer-forming monomer may be a compound having three or more amino groups. In the formula (4), R$_5$ may be a group other than a C1 to C20 alkylene group or an aromatic group. Examples of the hyperbranched polymer-forming monomer represented by the formula (4) include 3,5-diaminobenzoic acid and 3,5-diamino-4-methylbenzoic acid.

The hyperbranched polymer-forming monomer may be a compound represented by the following formula (5); i.e., a compound having one carboxyl group and two halogen atoms:

[F5]

(wherein R$_6$ represents a C1 to C20 alkylene group or an aromatic group, and X$_1$ and X$_2$ each represent a halogen atom).

Examples of the compound represented by the formula (5) include 3,5-dibromo-4-methylbenzoic acid, 3,5-dibromosalicylic acid, and 3,5-dibromo-4-hydroxy-benzoic acid.

The hyperbranched polymer-forming monomer is not limited to the aforementioned compound having one carboxyl group and two or more amino groups or having one carboxyl group and two or more halogen atoms. Any monomer capable of forming a hyperbranched polymer can be appropriately selected depending on the type of the reactive functional group of the modified silica nanoparticles.

In the case where the surfaces of silica nanoparticles are modified with a carboxyl group by a two-step reaction, a hyperbranched polymer can be bound to the modified silica nanoparticles by use of a compound represented by the following formula (6); i.e., a compound having one amino group and two carboxyl groups:

[F6]

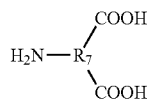
(6)

(wherein $R_7$ represents a C1 to C20 alkylene group or an aromatic group).

Examples of the compound represented by the formula (6) include 2-aminoterephthalic acid, 4-aminoterephthalic acid, and DL-2-aminosuberic acid.

The hyperbranched polymer-forming monomer may be another monomer represented by the following formula (7); i.e., a monomer having one amino group and two or more halogens:

[F7]

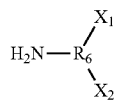
(7)

(wherein $R_8$ represents a C1 to C20 alkylene group or an aromatic group, and $X_1$ and $X_2$ each represent a halogen atom).

Examples of the compound represented by the formula (7) include 3,5-dibromo-4-methylaniline and 2,4-dibromo-6-nitroaniline.

In the case of using the silica nanoparticles having surfaces modified with a carboxyl group by the aforementioned two-step reaction, the compound of the formula (6) may have two or more carboxyl groups, the compound of the formula (7) may have two or more halogen atoms, and the hyperbranched polymer-forming monomer may be another monomer having a functional group (other than an amino group) capable of reacting with a carboxyl group, as in the case of using the silica nanoparticles having surfaces modified with an amino group by the aforementioned one-step reaction.

A single polymer chain of the hyperbranched polymer formed through the aforementioned reaction preferably has a weight average molecular weight of, for example, about 200 to about 2,000,000, and preferably has a branching degree of about 0.5 to about 1.

The aforementioned reaction can be performed as follows: the hyperbranched polymer-forming monomer is dissolved in the second solvent (i.e., one or more solvents selected from among tetrahydrofuran (THF), N-methylpyrrolidone (NMP), dimethylacetamide (DMAc), dimethylformamide (DMF), and γ-butyrolactone (GBL)); subsequently benzotriazol-1-yloxytris(dimethylamino)phosphonium hexafluorophosphate (BOP) (i.e., a carboxylic acid activating reagent) and triethylamine (i.e., a nucleophilic reagent) are bound to the solution, and the mixture is agitated; and the amino group-modified silica nanoparticles are bound to the mixture, and the resultant mixture is agitated. The aforementioned combination of BOP and triethylamine may be replaced with another combination. For example, the carboxylic acid activating reagent may be triphenylphosphine, and the nucleophilic reagent may be pyridine.

Dendrimer-bound silica nanoparticles will next be described. Now will be described addition of a dendrimer to amino group-modified silica nanoparticles.

For addition of a dendrimer to amino group-modified silica nanoparticles in the present invention, for example, a monomer represented by the following formula (8) (i.e., a monomer having three carboxyl groups):

[F8]

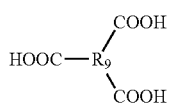
(8)

(wherein $R_9$ represents a C1 to C20 alkylene group or an aromatic group) or a monomer having four or more carboxyl groups must be bound to the amino group-modified silica nanoparticles. Examples of the monomer used include trimesic acid and pyromellitic acid.

The aforementioned addition of a monomer having three carboxyl groups or a monomer having four or more carboxyl groups is followed by addition of a monomer represented by the following formula (3) (i.e., a monomer having two amino groups at both terminals):

[F9]

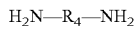
$H_2N-R_4-NH_2$ (3)

(wherein $R_4$ represents a C1 to C20 alkylene group, or $(C_2H_5-O-)_p$ and/or $(C_3H_7-O-)_q$, and each of p and q is an integer of 1 or more). These addition reactions are repeated to thereby prepare dendrimer-modified silica nanoparticles.

In the case of using the silica nanoparticles modified with a carboxyl group (i.e., a functional group) by the aforementioned two-step reaction, the carboxyl group-modified silica nanoparticles are treated with a monomer represented by the following formula (9) (i.e., a monomer having three amino groups):

[F10]

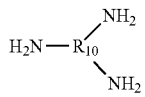
(9)

(wherein $R_{10}$ represents a C1 to C20 alkylene group or an aromatic group) or a monomer having four or more amino groups. Examples of the monomer represented by the formula (9) include 1,2,5-pentanetriamine and 1,2,4,5-benzenetetraamine.

Subsequently, a monomer represented by the following formula (10) (i.e., a monomer having two carboxyl groups at both terminals):

[F11]

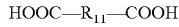
$HOOC-R_{11}-COOH$ (10)

(wherein $R_{11}$ represents a C1 to C20 alkylene group, or $(C_2H_5-O-)_p$ and/or $(C_3H_7-O-)_q$, and each of p and q is an integer of 1 or more) is bound to the resultant silica nanoparticles. Examples of the monomer include succinic acid, levulinic acid, and 0,0'-bis[2-(succinylamino)ethyl] polyethylene glycol (molecular weight: 2,000).

This addition is repeated to thereby prepare silica nanoparticles having surfaces modified with a dendrimer. The dendrimer-forming monomer may have a group other than an amino group and a carboxyl group.

The thus-prepared second solvent dispersion of hyperbranched polymer- or dendrimer-bound silica nanoparticles is dried, and then the resultant silica nanoparticles are mixed with a matrix resin. Finally, the mixture is formed into a membrane. Before mixing of the silica nanoparticles with a matrix resin, at least a portion of the second solvent may be replaced with another second solvent or a solvent other than the second solvent.

The matrix resin may be appropriately selected from, for example, known resins that have been conventionally used for forming a gas separation membrane. Specific examples of the matrix resin include, but are not limited to, polyimide, polysulfone, polydimethylsiloxane, poly(substituted acetylene), poly-4-methylpentene, and natural rubber.

Polyimide has particularly excellent strength, durability, and thermal resistance and exhibits excellent gas permeation selectivity, as compared with other resins. Thus, polyimide is preferred as a matrix resin for forming the gas separation membrane of the present invention. No particular limitation is imposed on the amine structure of polyimide. Examples of the amine structure include a phenylenediamine in which one of amino functional groups at ortho position is substituted by an alkyl group, a phenylenediamine in which all the amino functional groups at ortho position are substituted by an alkyl group or an aromatic group, a diamine having a biphenyl structure in which three or more hydrogen atoms are substituted by substituents, a diamine having a naphthidine structure, and a specific brominated diamine.

Particularly preferred are 1,3,5-trimethylphenylenediamine and 2,5-di-t-butyl-1,4-phenylenediamine from the viewpoint of gas separation performance.

No particular limitation is imposed on the acid dianhydride to be used. Preferred is pyromellitic dianhydride, naphthalenecarboxylic dianhydride, or 4,4'-(hexafluoroisopylidene)diphthalic dianhydride (6FDA). Particularly preferred is 6FDA from the viewpoint of gas separation performance.

Such diamine and acid dianhydride may be used in combination with other diacid anhydride and diamine (5% or less) for copolymerization. The copolymerization may be random copolymerization or block copolymerization.

No particular limitation is imposed on the polysulfone to be used, so long as the resin has at least one (—SO$_2$—) moiety in the molecular structure; for example, a repeating unit represented by the following formula (11):

[F12]

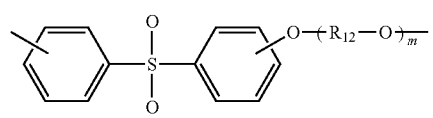

(11)

(wherein R$_{12}$ represents, for example, an aliphatic group or an aromatic group, and m is 0 or an integer of 1 or more).

Specific examples of the polysulfone include resins having the following repeating units.

[F13]

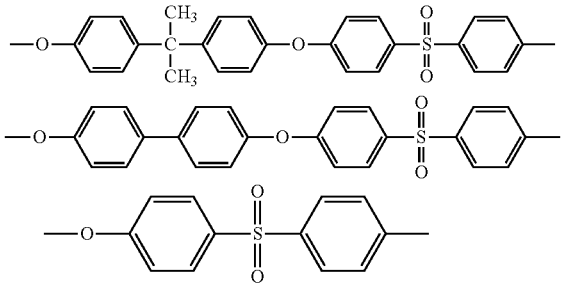

The hyperbranched polymer- or dendrimer-bound silica nanoparticles used in the present invention are bound to and mixed with a matrix resin solution, and the mixture is agitated. The resultant homogeneous mixture is applied to a substrate, to thereby form a membrane. The solvent used for this process may be the same as described above in the reaction for addition of the hyperbranched polymer.

No particular limitation is imposed on the amount of the hyperbranched polymer- or dendrimer-bound silica nanoparticles contained in the membrane, so long as the membrane can be formed. The amount of the silica nanoparticles is generally 1 mass % to 70 mass % relative to the entire composition of the membrane.

No particular limitation is imposed on the drying temperature after application of the silica nanoparticles-containing mixture to the substrate, so long as the solvent volatilizes at the temperature. The drying temperature is 10° C. to 300° C., preferably 30° C. to 200° C.

No particular limitation is imposed on the atmosphere during the drying. The drying is preferably performed in an inert gas or under vacuum for preventing the oxidation of the matrix resin. More preferably, the drying is performed under vacuum from the viewpoint of volatilization of the solvent.

The thus-produced resin membrane has an appropriately determined thickness, generally about 10 µm to about 100 µm.

The thus-produced resin membrane exhibits excellent gas permeation performance (e.g., gas selectivity and carbon dioxide permeability). In particular, the resin membrane exhibits considerably improved carbon dioxide permeability. One reason for this improvement is probably that the dispersibility of the hyperbranched polymer- or dendrimer-modified silica nanoparticles in a polymer matrix is improved through the surface modification of the silica nanoparticles in the presence of a solvent (i.e., via no drying process). Presumably, this improvement in dispersibility is attributed to the fact that the silica nanoparticles are uniformly dispersed without association in the organic solvent and the polymer matrix by means of the excluded volume effect of bound polymer chains. However, the present invention is not limited by such a presumption.

EXAMPLES

The present invention will next be described in detail by way of examples, which should not be construed as limiting the invention thereto.

[Example 1] (Synthesis of 3-aminopropyltriethoxysilane (APTES)-Modified Silica Nanoparticles by a Wet Process)

An isopropanol (IPA) dispersion of silica (IPA-ST, product of Nissan Chemical Corporation, silica concentration: 30 mass %, mean primary particle size: 12 nm) (33 mL) was added to a 200-mL eggplant-shaped flask and then diluted with IPA (166 mL). Ultrapure water (0.36 g) and APTES (manufactured by Tokyo Chemical Industry Co., Ltd.) (3.14 mL) were added to the flask, and the resultant mixture was agitated by means of a magnetic stirrer at room temperature for 48 hours. The resultant reaction mixture was subjected to centrifugation (1,500 G, 5 minutes), to thereby precipitate particles. After removal of the supernatant, ultrapure water was added, and the precipitate was dispersed again by means of an ultrasonic cleaner. This operation was repeated 12 times, to thereby prepare an aqueous dispersion of APTES-modified silica nanoparticles (400 mL). In order to determine the APTES modification condition of the resultant APTES-modified silica nanoparticles, the aqueous dispersion of APTES-modified silica nanoparticles was dried under vacuum at 110° C. for 15 hours, followed by thermogravimetric analysis by means of a TGA apparatus (DTG-60H, product of Shimadzu Corporation). The APTES-modified silica nanoparticles were found to contain APTES in an amount of 4.3 mass % and silica nanoparticles in an amount of 95.7 mass %.

The aqueous dispersion of APTES-modified silica nanoparticles (200 mL) was added to a 200-mL reaction vessel, and 1-methyl-2-pyrrolidone (NMP) (50 mL) was added thereto. Water was then removed through evaporation by means of an evaporator, to thereby prepare an NMP dispersion of APTES-modified silica nanoparticles (40 mL). Subsequently, NMP (6 mL), 1,3-diaminobenzoic acid (DABA) (product of Aldrich) (1.71 g), triethylamine (TEA) (product of Kanto Chemical Co., Inc.) (15.7 mL), and benzotriazol-1-yloxytris(dimethylamino)phosphonium hexafluorophosphate (BOP) (product of Tokyo Chemical Industry Co., Ltd.) (4.97 g) were added to an 80-mL reaction vessel, and the NMP dispersion of APTES-modified silica nanoparticles (40 mL) was added thereto. The resultant mixture was agitated at room temperature for five minutes, and then reaction was allowed to proceed by means of a microwave reactor (product of Discover SP, Chem, Japan) at 80° C. for one hour. The resultant reaction mixture was subjected to centrifugation (1,500 G, 5 hours), to thereby precipitate particles. After removal of the supernatant, NMP was added, and the precipitate was dispersed again by means of an ultrasonic cleaner. This operation was repeated three times, to thereby prepare a dispersion of DABA-modified silica nanoparticles (100 mL). The dispersion was dried under vacuum at 110° C. for 15 hours, to thereby prepare DABA-modified silica nanoparticles (0.65 g). In order to determine the DABA modification condition of the DABA-modified silica nanoparticles, the silica nanoparticles were subjected to thermogravimetric analysis by means of a TGA apparatus (DTG-60H, product of Shimadzu Corporation). The DABA-modified silica nanoparticles were found to contain DABA in an amount of 12.8 mass %, APTES in an amount of 3.8 mass %, and silica nanoparticles in an amount of 83.4 mass %.

The dried DABA-modified silica nanoparticles (0.0167 g) and tetrahydrofuran (THF, product of Kanto Chemical Co., Inc.) (3.2 mL) were added to a 10-mL vial, followed by dispersion treatment by means of an ultrasonic cleaner for 10 minutes. Polyimide represented by the following structural formula 1 (6FDA-3MPA, number average molecular weight: 2.5×10$^5$, weight average molecular weight/number average molecular weight=1.7) (0.15 g) was added to the dispersion, and the mixture was agitated by means of a magnetic stirrer at room temperature for 12 hours. The resultant polyimide dispersion containing the DABA-modified silica nanoparticles was poured into a glass petri dish (diameter: 6.1 cm), and the glass petri dish was placed in an oven set at 40° C. The oven was evacuated to vacuum over four hours, to thereby form a composite membrane. The composite membrane was peeled from the petri dish with ultrapure water, and then thermally treated at 150° C. for 15 hours.

[F14]

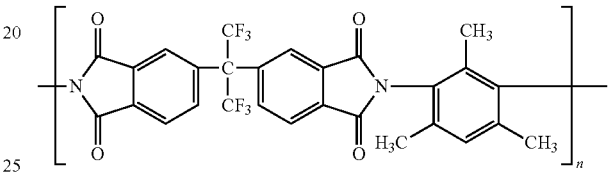

(Structural formula 1)

The above-formed composite membrane was analyzed for gas permeability. The analysis was performed by means of a gas permeability measuring apparatus (K-315N-01C, product of Rikaseiki Co., Ltd.) at a temperature of 35° C. and a pressure of 76 cmHg (feed gas: carbon dioxide, nitrogen, and oxygen). The results are shown in Table 1.

Example 2

The procedure of Example 1 was repeated, except that an NMP dispersion of DABA-modified silica nanoparticles was formulated so that the amount of the silica nanoparticles was 30 mass % relative to the total solid content of a membrane composition, to thereby form a composite membrane. The composite membrane was analyzed for gas permeability.

Example 3

The procedure of Example 1 was repeated, except that an NMP dispersion of DABA-modified silica nanoparticles was formulated so that the amount of the silica nanoparticles was 50 mass % relative to the total solid content of a membrane composition, to thereby form a composite membrane. The composite membrane was analyzed for gas permeability.

Comparative Example 1

An aqueous dispersion of silica nanoparticles (Snowtex-0, product of Nissan Chemical Corporation, silica concentration: 20 mass %, mean primary particle size: 12 nm) (100 g) was added to a 2-L eggplant-shaped flask and then diluted with ultrapure water (750 mL). APTES (product of Tokyo Chemical Industry Co., Ltd.) (131.2 mL) was added to the flask, and the resultant mixture was agitated by means of a magnetic stirrer at room temperature for 48 hours. The resultant reaction mixture was subjected to centrifugation (1,500 G, 20 minutes), to thereby precipitate particles. After removal of the supernatant, ultrapure water was added, and the precipitate was dispersed again by means of an ultrasonic cleaner. This operation was repeated three times, to thereby prepare an aqueous dispersion of APTES-modified silica nanoparticles (950 mL). In order to determine the APTES modification condition of the resultant APTES-modified silica nanoparticles, the aqueous dispersion of APTES-modified silica nanoparticles was dried under vacuum at 110° C. for 15 hours, followed by thermogravimetric analysis by means of a TGA apparatus (DTG-60H, product of Shimadzu Corporation). The APTES-modified silica nanoparticles were found to contain APTES in an amount of 8.9 mass % and silica nanoparticles in an amount of 91.1 mass %.

The dried APTES-modified silica nanoparticles (2.70 g) and 1-methyl-2-pyrrolidone (NMP, product of Kanto Chemical Co., Inc.) (21.5 mL) were added to a 100-mL eggplant-shaped flask, followed by dispersion treatment by means of an ultrasonic cleaner for 30 minutes. Triethylamine (TEA, product of Kanto Chemical Co., Inc.) (0.87 mL) and benzotriazol-1-yloxytris(dimethylamino)phosphonium hexafluorophosphate (BOP, product of Tokyo Chemical Industry Co., Ltd.) (2.50 g), and DABA (product of Aldrich) (0.87 g) were added to the flask, and the resultant mixture was agitated at room temperature for five minutes. Thereafter, reaction was allowed to proceed by means of a microwave reactor (product of Discover SP, Chem, Japan) at 80° C. for 0.5 hours. The resultant reaction mixture was subjected to centrifugation (1,500 G, 1 hour), to thereby precipitate particles. After removal of the supernatant, NMP was added, and the precipitate was dispersed again by means of an ultrasonic cleaner. This operation was repeated three times, and then the dispersion was dried under vacuum at 110° C. for 15 hours, to thereby prepare dry DABA-modified silica nanoparticles. In order to determine the DABA modification condition of the surfaces of the DABA-modified silica nanoparticles, the silica nanoparticles were subjected to thermogravimetric analysis by means of a TGA apparatus (DTG-60H, product of Shimadzu Corporation). The DABA-modified silica nanoparticles were found to contain DABA in an amount of 5.30 mass %, APTES in an amount of 8.40 mass %, and silica nanoparticles in an amount of 86.3 mass % (roughly estimated values). 6FPDA-3MPA (0.15 g) was dissolved in THF (3.21 mL), and then the dry DABA-modified silica nanoparticles (0.0167 g) were added to the polymer solution, followed by ultrasonic treatment for one hour. In the same manner as in Example 1, a composite membrane was formed, and the composite membrane was analyzed for gas permeability.

Comparative Example 2

The procedure of Comparative Example 1 was repeated, except that the amount of the DABA-modified silica nanoparticles was adjusted to 30 mass % relative to the total solid content of a membrane composition, to thereby form a composite membrane. The composite membrane was analyzed for gas permeability.

Comparative Example 3

The procedure of Comparative Example 1 was repeated, except that the amount of the DABA-modified silica nanoparticles was adjusted to 40 mass % relative to the total solid content of a membrane composition, to thereby form a composite membrane. Since the membrane was broken, it was not analyzed for gas permeability.

TABLE 1

|  | Silica/Total solid content (mass %) | $P_{CO2}$ | $P_{N2}$ | $P_{O2}$ |
|---|---|---|---|---|
| Example 1 | 10 | 646 | 35.9 | 123 |
| Example 2 | 30 | 852 | 47.6 | 163 |
| Example 3 | 50 | 1260 | 76.3 | 252 |
| Comp. Example 1 | 10 | 620 | 33.1 | 113 |
| Comp. Example 2 | 30 | 679 | 45.8 | 154 |

P: gas permeation coefficient

Barrer=$1 \times 10^{-10}$ ($cm^3$(STP)cm/$cm^2$·sec·cmHg)

As shown in Table 1, the gas permeation coefficient was improved for each gas.

The invention claimed is:

1. A method for producing a gas separation membrane, the method comprising:
treating surfaces of silica nanoparticles dispersed in a first solvent with a reactive functional group-containing compound, while the silica nanoparticles are being dispersed in the first solvent, to thereby prepare a first solvent dispersion including reactive functional group-modified silica nanoparticles, wherein the first solvent is at least one solvent selected from among water and C1 to C4 alcohols;
replacing the dispersion medium of the first solvent dispersion including the reactive functional group-modified silica nanoparticles with a second solvent without drying of the dispersion medium, and then reacting the reactive functional group-modified silica nanoparticles with a dendrimer-forming monomer or a hyperbranched polymer-forming monomer in the presence of the second solvent so that a dendrimer or a hyperbranched polymer is bound to the reactive functional group, to thereby prepare dendrimer-bound or hyperbranched polymer-bound silica nanoparticles;
mixing the dendrimer-bound or hyperbranched polymer-bound silica nanoparticles with a matrix resin to form a mixture; and
applying the mixture to a substrate, and then removing the second solvent.

2. The method for producing the gas separation membrane according to claim 1, wherein the second solvent is at least one solvent selected from among tetrahydrofuran, N-methylpyrrolidone, dimethylacetamide, dimethylformamide, and γ-butyrolactone.

3. The method for producing the gas separation membrane according to claim 1, wherein the reactive functional group-containing compound is a silane coupling agent.

4. The method for producing the gas separation membrane according to claim 1, wherein the reactive functional group-containing compound is a compound represented by the following formula (1):

[F1]

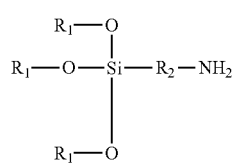

(1)

wherein
$R_1$ represents a methyl group or an ethyl group, and
$R_2$ represents a C1 to C5 alkylene group.

5. The method for producing the gas separation membrane according to claim 4, wherein,
in the treating the surfaces of silica nanoparticles, the surfaces of silica nanoparticles are treated with the reactive functional group-containing compound represented by the formula (1) and then treated with another reactive functional group-containing compound, which is a compound represented by the following formula (2) or an acid anhydride thereof, while the silica nanoparticles are being dispersed in the first solvent, to thereby prepare the first solvent dispersion including reactive functional group-modified silica nanoparticles,
the formula (2) is:

[F2]

where $R_3$ represents a C1 to C20 alkylene group or an aromatic group.

6. The method for producing the gas separation membrane according to claim 1, wherein
the reactive functional group-modified silica nanoparticles include amino group-modified silica nanoparticles,
the dendrimer-forming monomer includes a combination of a compound having three or more carboxyl groups and a compound having two or more amino groups, and
the reacting the reactive functional group-modified silica nanoparticles includes sequentially adding the compound having three or more carboxyl groups and the compound having two or more amino groups.

7. The method for producing the gas separation membrane according to claim 6, wherein
the reactive functional group-modified silica nanoparticles include carboxyl group-modified silica nanoparticles,
the dendrimer-forming monomer includes a combination of a compound having three or more amino groups and a compound having two or more carboxyl groups, and
the reacting the reactive functional group-modified silica nanoparticles includes sequentially adding the compound having three or more amino groups and the compound having two or more carboxyl groups.

8. The method for producing the gas separation membrane according to claim 1, wherein the hyperbranched polymer-forming monomer is a compound having one carboxyl group and two or more amino groups or halogen atoms.

9. The method for producing the gas separation membrane according to claim 1, wherein the hyperbranched polymer-forming monomer is a compound having one amino group and two or more carboxyl groups or halogen atoms.

10. The method for producing the gas separation membrane according to claim 1, wherein the matrix resin is at least one species selected from the group consisting of polyimide, polysulfone, polydimethylsiloxane, poly(substituted acetylene), poly-4-methylpentene, and natural rubber.

11. The method for producing the gas separation membrane according to claim 1, wherein, in the mixing the dendrimer-bound or hyperbranched polymer-bound silica nanoparticles with the matrix resin to form the mixture, the dendrimer-bound or hyperbranched polymer-bound silica nanoparticles are present in the mixture in an amount of 1 mass % to 70 mass %.

12. The method for producing the gas separation membrane according to claim 1, wherein, in the removing the second solvent, the second solvent is removed by heating.

13. The method for producing the gas separation membrane according to claim 1, wherein, in the removing the second solvent, the solvent is removed under vacuum.

* * * * *